Figure 1:
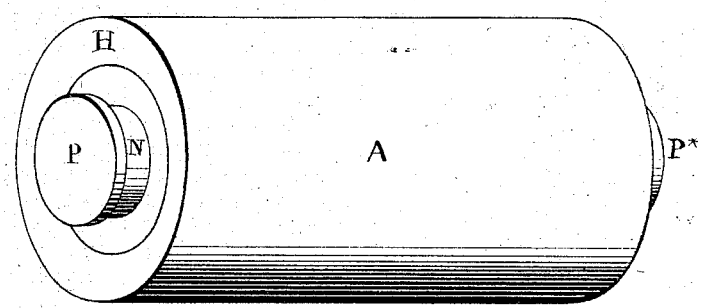

J. W. MASURY.
Paint-Vessels and Packages.

No. 141,061.  Patented July 22, 1873.

Witnesses.
Fred L. Miller
Francis B. Carleton.

Inventor.
John W. Masury

UNITED STATES PATENT OFFICE.

JOHN W. MASURY, OF BROOKLYN, NEW YORK.

IMPROVEMENT IN PAINT VESSELS AND PACKAGES.

Specification forming part of Letters Patent No. 141,061, dated July 22, 1873; application filed May 15, 1873.

*To all whom it may concern:*

Be it known that I, JOHN W. MASURY, of the city of Brooklyn, county of Kings and State of New York, have invented a new and Improved Paint-Tube; and I do declare the following specification, taken in connection with the drawing accompanying and forming a part thereof, is a full, clear, and exact description of my invention and the method of putting the same in operation.

The object of my present invention is to overcome the objections to, and prevent the defects in, the present system of putting up for consumption in small quantities paints and substances of similar consistency. Few substances in common use are so liable to deterioration and destructive waste as paint prepared for consumption by being ground in oil or other vehicle. For convenience of transportation, and for protection from atmospheric and other influences prior to its use, the paint is generally packed in air-tight boxes or cans, which are cut or broken open when their contents are required for use. As the instances are rare in which it happens that the entire contents of the package are consumed at the time it is opened, the remainder is necessarily exposed to the drying and other injurious influences of the atmosphere. Deterioration commences with the exposure, and the certain waste of the remaining contents is only a question of time. It has been estimated that from this cause—viz., deterioration from exposure—about fifteen per cent. of all the paint prepared for use in the United States becomes wasted. With the fine and more expensive colors—such as are used in coach and carriage work, and which are ground in quickly-drying vehicles, like varnish and turpentine—the deterioration is so rapid that the exposed contents of a package may, in the absence of great care on the part of the workman, become quite useless and worthless in the lapse of a few days. Prior to my invention there were in general use two methods of putting up paints prepared for consumption. The first and most extensively used method was the cylindrical tin box or can. The other consisted of a malleable or compressible tin tube, tightly closed at one end, and provided with a screw-cap at the other. This cap covered an orifice, through which, when uncovered, the contents were expelled by compressing the malleable sides of the tube. This latter method was used chiefly for artists' fine oil-colors, and although it preserved the contents from deterioration, yet, through the liability of the tube to rupture, and for other reasons, the compressible tubes were limited to packages of very small size. The great bulk of prepared paints were put up in the hermetically-sealed tin cans, which were tightly soldered until opened for use, and which, after once being opened, were exposed continually to atmospheric deterioration. By the use of my invention the contents of a paint-can will be protected from the air and its deteriorating effects during any length of time that may elapse between the opening of the can and the entire consumption of its contents. The invention consists in the construction of a metallic tube with apertures opposite each other in the ends thereof, and containing inside a movable diaphragm for expelling the contents.

Figure 2:
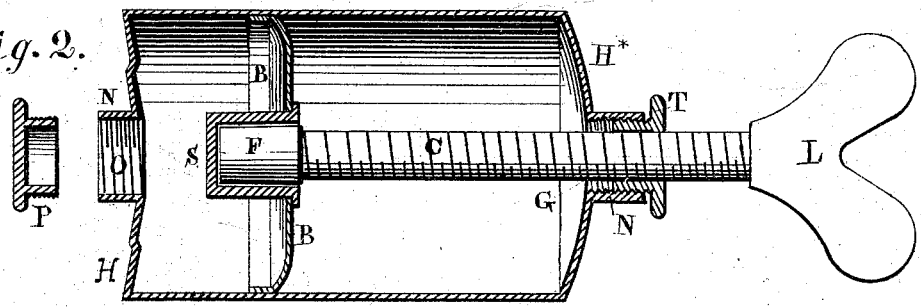
Figure 3:
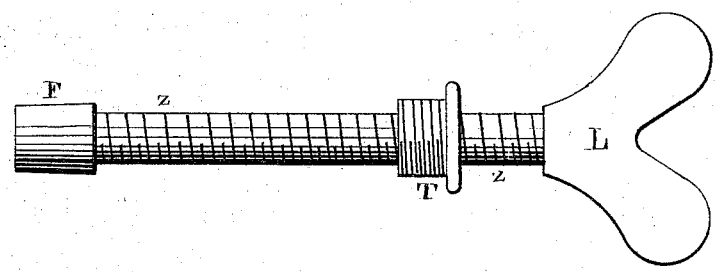

In the accompanying drawings, Figure 1 is an outside view of my improved paint-tube closed and ready for transportation. Fig. 2 is a central longitudinal section of the same, showing the diaphragm and the propelling-rod. Fig. 3 is a view of the propelling-rod, with its traveling screw-cap.

Similar letters of reference indicate corresponding parts.

A in the drawing represents the body of the paint-tube, made of sheet metal, in tubular or prismatic form, and of a suitable size, the ends of which are closed by having soldered to them the heads H* H. In the center of these heads are openings, which may be continued outwardly in the form of metallic nozzles N N. These openings are covered by plugs or caps P* P screwed over or into them, thus completely closing the tube when packed for transportation or not in use. B is a diaphragm of metal or other suitable material, of a size to closely fit the tube A on its inside, and of such a thickness as to be strong enough to expel all the contents of the tube when pushed through it. If a flat plate is used for this purpose it will have to be of a greater thickness than the ordinary sheet metal, and therefore be too heavy or occupy too much valuable space; but by one of the features of my invention I am enabled to make a diaphragm of ordinary sheet metal strong enough for the purpose required. This is accomplished by making it of a concavo-convex form, B B, as shown in Fig. 2. This form gives it greater resisting power, while the edges, coming up along and almost parallel with the sides of the tube, scrape along every portion of the contents, and in a measure prevent the diaphragm from tilting to one side. The heads of the tube H* H are made of a form to correspond with that of the diaphragm—that is, one head, H*, close to which the diaphragm B is placed when the can is first filled, is convex on the outside, and the opposite head H, through whose opening the paint is ejected, is concave on the outer side. This correspondence of shape between the diaphragm and the heads prevents the waste of any space of the end H*, and enables every particle of the contents to be expelled at the end H. In the attempt to force a flat sheet-metal diaphragm through a tube the result almost invariably is that the diaphragm will turn around sidewise and edgewise, and allow the propelling force to go by it, it being difficult to evenly force a diaphragm through to overcome the resistance of the contents unless the diaphragm was so thick that its depth afforded a resisting surface to the sides of the can, or the diaphragm was only attached to a piston-rod, so as to make the device substantially a syringe or pump. I have invented two features for keeping the plane of the diaphragm B even during its passage through the tube A. The first is, providing the tube A with guides, which are made, during the construction of the tube, as follows: The body of the cylinder is formed by soldering together two or more pieces (four are preferable) of sheet metal, which have been struck out with each side edge turned in, so as to form a portion of a radius to the arc of its convexity. The cylinder is formed by soldering these sections together, and the projecting edges will serve as guides to prevent the diaphragm from tipping. The diaphragm B, in this event, is provided with corresponding slots to receive the guides. It is obvious that the body of the cylinder A might be formed of one piece of metal, having in it deep corrugations instead of the distinct edges. But the best method of preserving the position of the diaphragm B is shown in another feature of my invention, viz., the diaphragm B is constructed with a thimble or socket, S, projecting from or sunk into its center for the reception of the rod or driver that propels the diaphragm. This socket S is one of the most valuable features of my invention for fitting over the end F of the propelling-rod R. It keeps the plane of the diaphragm at right angles to the line of direction in which it moves. It is obvious that a finger projecting from the diaphragm and fitting into a socket on the propelling-rod would be an equivalent of the features just described. C is the rod which is used for propelling the diaphragm, and is constructed with one end in the shape of a finger or socket, F, to fit into or over the thimble S on the diaphragm B, and the other end flattened out into arms L L for applying a leverage by means of the thumb and finger. The body of the rod C is surrounded by spiral threads Z Z, running at a tolerably rapid inclination. Along the rod C, between the extremity F and the arms L L, plays a milled-headed piece of metal, T, constructed with threads on the inside to correspond with the threads Z Z on the rod C, and threads on the outside to correspond with the threads of the aperture G, so that the metallic traveler T can be screwed in the aperture G, and form a cap, through which the rod C plays. The object of this double system of threads on the rod C and traveler T is to enable the rod C, when screwed in, to be propelled more rapidly than it would be if its threads corresponded with the threads of the aperture G, the latter being of a very slow inclination to insure a firm connection of the plug-cap. The end H of the tube A is constructed with a ring of thin metal, which can be cut through and enable the whole end to be taken out if at any time it is desired to get out the whole contents of the tube at once. This is a feature which has been already patented by me, and is described in my patent dated July 12, 1859.

Having now described the construction of my newly-invented apparatus, the operation is shown as follows: To the metallic body A is soldered the head H*, with its plug-cap P* tightly screwed in. The diaphragm B is then inserted in the tube A and pushed down with its convex side snug against the convex end H*. The head H is then soldered on and the tube filled with paint through the aperture in the head H. When filled the plug-cap P is screwed in and the tube is hermetically closed ready for packing. When it is desired to use a portion of the contents of the tube the plug-cap P* is unscrewed and the rod C inserted through the aperture, so that the finger F fits into the thimble S on the diaphragm B. The traveler T is then screwed into the place of the plug-cap P*, closing the aperture tightly, and the plug-cap P, at the opposite head of the tube, is removed; then, by screwing in the rod C, the diaphragm B is forced forward, expelling the contents of the tube from the aperture O in just such quantities as are required for use. The rod C can be removed and the plug-caps P* P readjusted. The diaphragm B will remain in the position in which it is left in the tube, and the paint which remains will be fully protected from atmospheric influences, being closely confined between the head H* and the diaphragm B.

Among the advantages of my invention will be seen the following features, viz: The construction of the diaphragm in the shape described gives strength without occupying the space it would take if thicker. The adaptation of the shape of the heads of the tube to the sides of the diaphragm also economizes space and enables all the contents to be completely ejected from the tube. The threads on the rod C might be made to fit directly into the threads cut for the plug-caps; but the duplex system, as described, enables the rod to be propelled much more rapidly than it would in the former case, and prevents the wearing out of the threads of the aperture. The contents of the tube are preserved from deterioration so long as any portion remains therein. Each tube is compact and complete in itself, and can be carried in the pocket ready for use. A single rod can be used for any number of tubes, as one cork-screw is enough to open innumerable bottles. The increase of expense over that of an ordinary tin can is trivial. The arrangement of the two plug-cap apertures in opposite heads of the tube is valuable, for the reason that the correspondence of the aperture O in a line with the aperture G enables the whole contents to be expelled when the diaphragm B is moved to the end H, (providing the aperture O is large enough to permit the socket to protrude,) whereas paint would be left in the tube at the end if the aperture was at the side of the can instead of at the middle; second, it enables the can to be filled more readily by introducing the material through the aperture; third, it enables the diaphragm B to be pushed back to the end H* without breaking open the can, and thus the same can may be refilled and used many times.

Having thus described my invention and its operation, I do not make the broad claim of expelling the contents of a receptacle by the piston-like action of a plunger, for that is old; nor do I claim a can with a screw-nozzle at one end for the escape of the contents; nor do I claim a can beaded at top and at bottom, and having inclosed a solid plunger fitting the sides at all points, the stem of the plunger working through a central opening in the head, substantially as shown and described; but

What I do claim as my invention, and desire to secure by Letters Patent, is—

1. The arrangement of an aperture, O, in one end of a tube opposite to the aperture G in the other end, in combination with an independent movable diaphragm, B, substantially as and for the purposes specified.

2. The movable diaphragm B, provided with the socket S, or its equivalent, for the purpose of preventing the canting of the diaphragm in a receptacle for plastic substances when pressure is applied.

3. A movable diaphragm of a concavo-convex form in a can or tube, substantially as and for the purposes specified.

4. A tube or can for plastic material, with its ends or heads, the one of a convex and the other of a concave shape, in combination with a concavo-convex diaphragm, substantially as and for the purposes specified.

5. As a new article of manufacture, pocket paint-cans, made substantially as and for the purposes specified.

6. The propelling-rod C, with a socket or finger, F, used in combination with a projection or socket in a movable diaphragm, in a can for plastic material, substantially as and for the purposes specified.

7. A traveler or screw-cap, T, in combination with a propelling-rod which works through it to force down a diaphragm, substantially as and for the purposes specified.

JOHN W. MASURY.

Witnesses:
   FRED. L. MILLER,
   FRANCIS B. CARLETON.